United States Patent
Miller

[11] 3,864,018
[45] Feb. 4, 1975

[54] METHOD AND MEANS FOR SPLICING ARRAYS OF OPTICAL FIBERS

[75] Inventor: Calvin Max Miller, Lilburn, Ga.

[73] Assignee: Bell Telephone Laboratories, Incorporated, Murray Hill Heights, N.J.

[22] Filed: Oct. 18, 1973

[21] Appl. No.: 407,528

[52] U.S. Cl. .................................. 350/96 C, 65/4
[51] Int. Cl. ............................................ H01r 15/00
[58] Field of Search ................ 350/96 B, 96 C; 65/4

[56] References Cited
UNITED STATES PATENTS
3,768,146  10/1973  Braun................................ 350/96 C

*Primary Examiner*—James W. Lawrence
*Assistant Examiner*—C. E. Church
*Attorney, Agent, or Firm*—C. E. Graves

[57] ABSTRACT

Multiple linear arrays of optical fiber cable are aligned and spliced by use of a thin rigid chip with a large number of closely spaced parallel longitudinal fiber-receiving grooves having a uniform cross section. An array splice is built by stacking successive layers of chips and linearly arrayed fibers. A termination is prepared from the foregoing by end grinding or the like. Two ends so prepared are then brought together and aligned by one or two aligning modules having grooves which are mating opposite to those of the chip. The system achieves relatively precise and reliable axial alignment for corresponding fibers of the two prepared terminations.

7 Claims, 10 Drawing Figures

PATENTED FEB 4 1975 3,864,018
SHEET 3 OF 3

METHOD AND MEANS FOR SPLICING ARRAYS OF OPTICAL FIBERS

FIELD OF THE INVENTION

This invention relates to optical fiber communications media, and more particularly, to a means and method for connecting or splicing groups of optical fibers contained, for example, in an optical fiber cable.

BACKGROUND OF THE INVENTION

Although optical fibers are now producible which compete favorably with other communication transmission media for some applications, the mass splicing of fibers in quick and economic fashion remains an unsolved problem. Unlike mass joining of wire media which only requires good electrical contact, the linking of two optical fibers requires their axial alignment. The problem in mass splicing of groups of optical fibers is, therefore, to position a first end array of fibers next to a second similar end array, so that the corresponding fibers are all in precise axial alignment.

Other requirements, however, besides the above are readily foreseeable for successful field splicing of optical fibers. Good ends must be assured for each fiber, and since this usually involves sawing or polishing, a system of splicing must be amenable to those operations. Further, space requirements are likely to be critical and therefore a large buildup of mass at the splice point is not tolerable. Also, some kind of potting of the optical fibers to retain the alignment geometry is usually necessary; and thus, any fiber connector must be adaptable to the potting step.

Accordingly, the following are the principal inventive objects:

to economically and reliably splice a large number of optical fibers in a relatively few steps;

to align any number of optical fibers in a desired end array X-Y configuration, such that the center-to-center axial spacing is extremely accurate; and to achieve optical fiber mass field splices with a minimum of tooling and of mass buildup at the splice point.

SUMMARY OF THE INVENTION

In accordance with the central inventive contribution, optical fibers are aligned in highly precise and duplicatable end arrays by a simple precision chip with spaced, parallel fiber-receiving grooves on the top and bottom surface. Characteristically, the chip is very thin but rigid. The chip takes advantage of the heretofore unappreciated fact that optical fibers can be inserted with surprising ease in gangs into suitably shaped and spaced grooves.

Thus, a sizable number of fibers in a linear configuration can be placed into grooves in the above-described chips, all at one time. In a typical illustrative embodiment, fibers which are contained, for example, in a fiber ribbon structure are exposed by removing supporting ribbon material at an end. Thereafter, chips and layers of exposed fibers are interleaved until all fiber ribbons have been thus stacked. Then the stacked array can be potted to maintain the precision array geometry. The resulting structure when solidified is readily amenable to sawing or polishing.

Pursuant to one inventive mode, an actual splice consists of a butt joint of two such arrays, which advantageously are aligned with respect to one another by use of the top and bottom grooves of the outermost chips and a ridged alignment device that engages the corresponding top and bottom ridges of the two opposed assemblies. Importantly, alignment of the outermost grooves with a reverse ridge chip assures the coincidence of the two opposed optical fiber arrays within. Index matching fluids and suitable mechanical support for the butt joint halves complete the splice.

The invention and its further objects, features, and advantages will be more readily discerned from a reading of the description to follow of illustrative embodiments.

DETAILED DESCRIPTION OF ILLUSTRATIVE EMBODIMENTS

Figure 1:
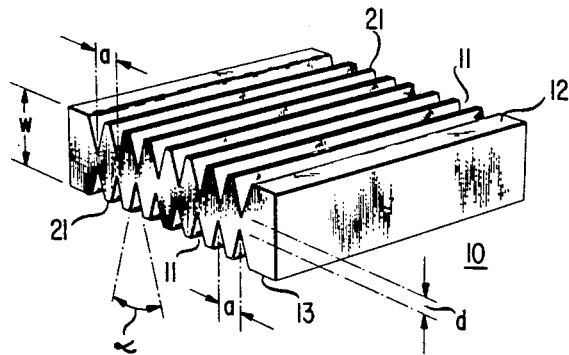
FIG. 1 is a perspective diagram of a groove chip.

The primary alignment mechanism for assembly of optical fibers into a uniform rectangular array is the module or chip denoted 10 and shown in FIG. 1. Chip 10 is characterized principally by a series of spaced parallel longitudinal grooves 11 placed into the top surface 12 and bottom surface 13 respectively. The top surface grooves 12 are identical geometrically to grooves 13 of the bottom surface; and each top groove is in vertical alignment with a corresponding bottom groove. Typically, the angle defined by the opposite walls of each groove 11 is in a range of 60° to 120°, and most advantageously is 90° for reasons to be developed below.

Figure 2:
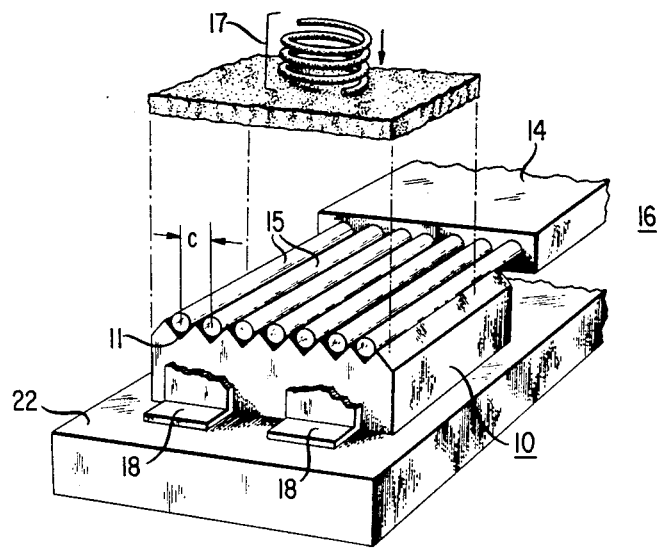
FIG. 2 is a front perspective view of a jig for assembling chips and linearly arrayed fibers.

Presently preferred optical cable configurations consist of a linear array of fibers held in spaced, parallel relation by some suitable flexible structure. These assemblies are commonly termed optical fiber ribbons. One such structure is generally depicted in FIG. 2 as consisting of a support or membrane 14 holding a plurality of spaced-apart and parallel optical fibers, all denoted 15. The optical fiber ribbon assembly is denoted 16. The invention will hereinafter be described by reference to ribbons such as ribbon 16; but it will be apparent that the invention is not limited to splicing of a plurality of such ribbons.

The ribbon depicted in FIG. 2 is prepared first by removing the membrane material for a small distance back along the ribbon, thus to expose the spaced-apart parallel optical fibers 15. Then, a chip such as chip 10 is placed upon a flat bed such as 22. The distance "$a$" between the groove centers of the chip 10, denoted in FIG. 1 is by design nominally the same as the center-to-center spacing denoted $c$ between the fibers 15 of the ribbon 16.

With a flat bed 22 to support the chip 10, the fibers 15 are placed into the grooves 11. The motion by which this is best achieved varies. A sliding movement of the fibers 15 after first introducing the fiber ends 15 into the grooves of chip 10 has been found successful. Also, a rubber or compliant roller (not shown) aids in the process, which is readily manual without need for micromanipulation or special tooling.

Figure 3:
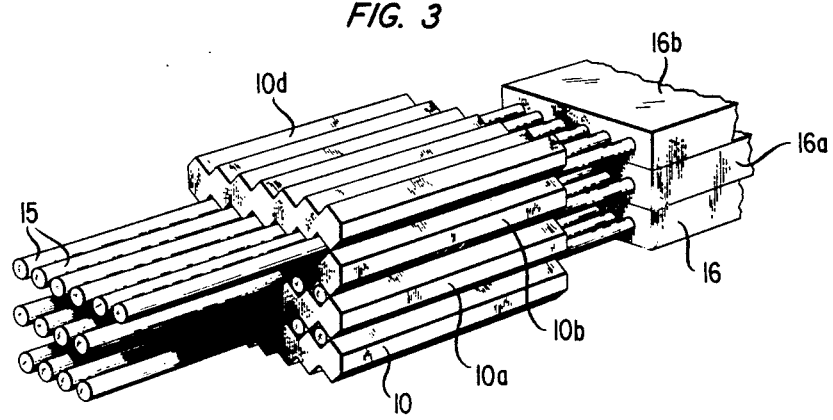
FIG. 3 is a side perspective view of a number of stacked chips containing successive layers of fibers.

Advantageously, the chips 10 are positioned on bed 22 by stops 18 which can be as long as necessary in elevation. When the optical fibers of ribbon 16 have been placed in the grooves, a second chip, such as is denoted 10a in FIG. 3 is placed astride the optical fibers 15, and the fibers of a second ribbon 16a are placed in the top grooves of the chip 10a. A third chip 10b then is placed with its bottom grooves astride the optical fibers of ribbon 16a, and the fibers of a third ribbon 16b are then placed in the top grooves of chip 10b. This process consisting of interleaving chips and layers of optical fibers continues until all ribbons have been stacked. A spring-loaded pad such as 17 depicted in FIG. 2 aids in the process, by helping to maintain the elements in position as the assembly of the butt splice progresses. Spring-loaded pad 17 can of course be any other similar structure such as a spring clip (not shown).

After the chip and layer assembly is completed, the assembly is potted by allowing a quick setting resin such as epoxy to seep through the array. When the epoxy sets up, the fiber ends are prepared by sawing the assembly in a plane so that the fiber ends and the chip ends all fall in a selected plane which is perpendicular to the fiber axes. The butt end thus produced is then ground and polished. Advantageously, the mating butt splice can be polished in the same operation so that the butting surfaces are true flat and perpendicular to the optic axes of both sets of optical fibers. To this end, the unoccupied grooves of the top and bottom chips of the stacked array depicted in FIG. 3 are used as reference slots for aligning during the polishing as, for example, by employing a reverse ridge fixture such as 30 in the manner depicted in FIG. 7.

Figure 7:
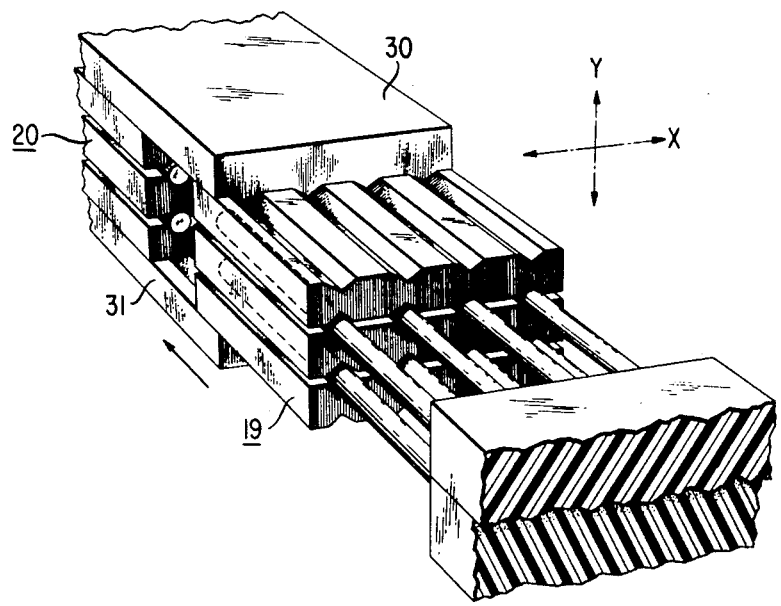
FIG. 7 is a perspective view showing two stacked end arrays of optical fibers in chips being placed in axial alignment.
Figure 8:
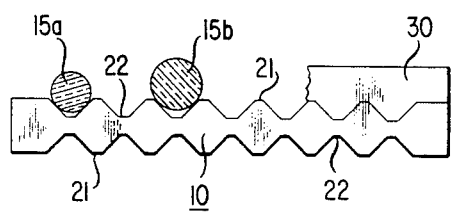
FIGS. 8, 9, 10 are end views in parallel cross section of alternate fiber-receiving grooves designs for the chip.

The two ends of an optical fiber butt joint connector are thus prepared for interfacing. One advantageous way of achieving the latter is shown in FIG. 7. There, the two identical butt joint connections denoted 19 and 20 respectively are aligned by reverse ridge fixtures 30, 31. These have a profile that is the mating opposite to the profile of the top and bottom chips 10, as illustrated in FIG. 8. When held flush against the top and bottom chips 10 of the connector 20, and in overhanging relation as shown, the fixtures 30, 31 constitute, in effect, a female guide path for the butt joint connector 19 to be inserted into. Alternatively, the fixture 31 may be secured in flush fashion with the connector 20 while the fixture 30 is secured to the connector 19, both in overlapping relation, and the two butt joint ends can then be brought together. Still further, use of only one of the fixtures, such as 31 will essentially effect the desired alignment of the connectors 19, 20. In all instances, the reverse ridge fixtures 30, 31 provide alignment both in the X and in the Y direction as illustrated by the axis system of FIG. 7, without aid of tools, microscopes, or micromanipulators.

The fixtures 30, 31 provide mechanical protection as well; but for the alignment function alone, alternate structures such as round dowels (not shown) placed across the corresponding grooves of the top and bottom chips respectively, can also suffice.

The butt joint is completed by applying suitable conventional index matching material or index matching cement between the ends to be spliced before they are moved toward each other and into contact. A more permanent splice can be made by using an epoxy resin to pot the entire butt joint, preferably with index matching resin. Alternatively, a plastic can be molded entirely over the butt joint. Other mechanical support members (not shown) can be applied in bridgelike fashion across the splice to lend further support.

Figure 5:
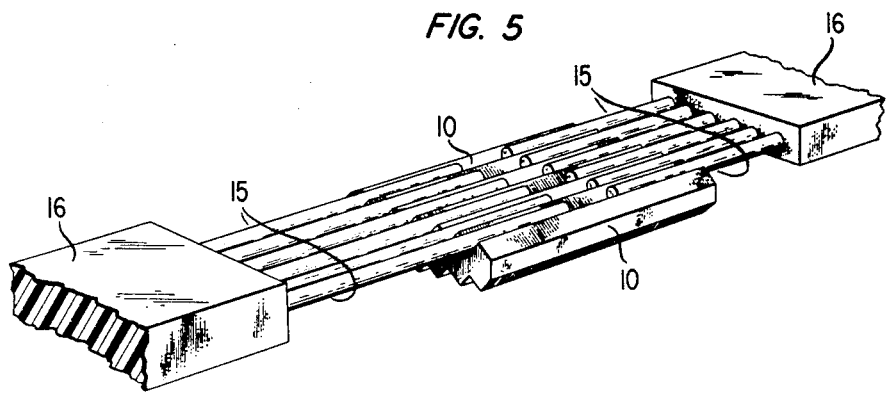
FIG. 5 is a side perspective view showing two linear arrays of optical fibers being aligned by a chip.
Figure 6:
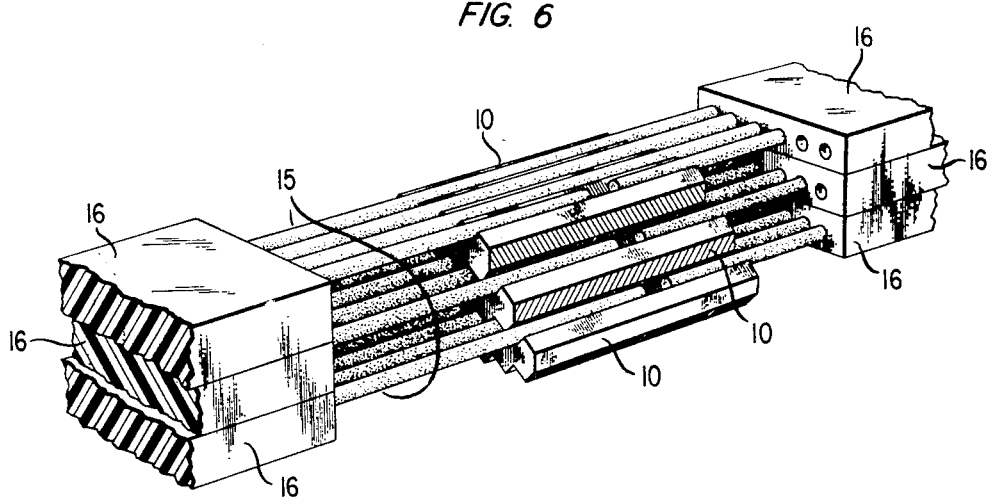
FIG. 6 is a side perspective view of successive layers of fibers of different cables being aligned by stacked chips.

When flattening and preparing of the optical fiber ends can be achieved in advance of introducing the fibers into the grooves, an array connection of fibers can be achieved. Two linear arrays 15 of fibers from separate fiber ribbons 16 to be joined are laid in the grooves of a chip 10 with corresponding fiber ends facing, as seen in FIG. 5. Index matching liquid is applied, and then as in FIG. 6 another chip 10 is placed atop the bottom one. A second pair of fiber ribbons 16 are then added, and so on. After the splice is thus built up, potting compound is applied.

Figure 9:
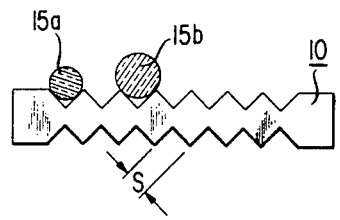

In its prepared embodiment, the chip 10 exhibits certain characteristics. As seen with aid of FIGS. 1 and 9, when the pitch angle of the grooves 11, denoted $\alpha$, is substantially 90°, a circular cross-section optical fiber is supported by a given chip at two points spaced 90° apart. This is true for all fiber radii between $s$ and $s/2$ where $s$ is the side length of a groove when a V groove geometry is used. A modified V groove with a flattened bottom reduces $s$ while not affecting the range of fiber radii accommodated by the groove. This groove geometry also adds strength to the chip by adding material at its thinnest cross section. This principle is illustrated in FIGS. 8 and 9 which show two chips, both having groove pitch angle $\alpha = 90°$, the grooves containing different diameter optical fibers denoted 15a and 15b. A given fiber will therefore be held between two chips along four lines of contact spaced 90° apart.

It is presently envisioned that communication grade optical fibers will be optimal in a diameter range of approximately 3–6 mils, and more preferably, close to 4 mils. This constraint dictates the center-to-center groove spacing denoted $a$, which can be as little as 6 mils. Vertical space is conserved by maintaining the chip width $w$ at as small a figure as possible. Chips 6.5 to 8 mils in width have been found practicable. The web portion of each chip, denoted $d$, is sufficient if maintained at about 2 mils. It is seen from the above dimensional data that the scale of detail in the chip 10 design makes possible very compact and yet accurate aligning optical fiber assembly.

Although the preferred groove pitch angle $\alpha$ is substantially 90°, so as to supply four lines of support spaced substantially 90° apart for each optical fiber, the invention contemplates a pitch angle that can vary from about 60° to about 120° as being fully workable for alignment purposes. Any pitch angle $\alpha$ within this range gives for each fiber four supporting lines which are spaced at least 60° apart and thus will supply alignment support from distinctly different and opposed directions. A pitch angle $\alpha$ of 120° does provide a somewhat greater mouth for the optical fibers to find initially, as in FIG. 2, given the same diameter fiber. The lateral alignment in the X direction sense of FIG. 7 however, is not as positive as with lesser angles.

Figure 4:
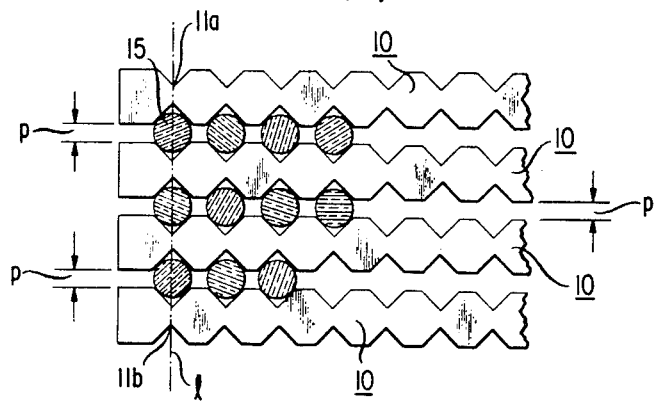
FIG. 4 is an end view of the apparatus of FIG. 3.

The groove geometry advantageously is selected so that for a given optical fiber diameter, a space in the order of 0.1 to 5 mils and denoted p in FIG. 4 will be provided between adjacent chips 10. Thus, in the preferred embodiment, the chips ride upon the enveloped optical fibers, without coming into contact with another. This aspect of the invention, involving chip separation, best assures that the fibers are held in the intended geometry; for were there no spacing between the chips, some fibers would inevitably have leeway to move out of alignment.

A further advantage of chip separation is that the interchip spaces constitute a path for potting compounds to flow aided by gravity, capillary action or mechanical brushing—thus hastening the entry of potting compound and its setup time.

The chip-optical fiber configuration of FIG. 4 illustrates a further principle of the invention. With each of the fibers 15 captured between the two chips as shown, the location of the outside groove 11a and the outside groove 11b fall in a plane, denoted l, which includes the axes of all fibers at that plane in the chip assembly. Hence, alignment of the grooves 11a and 11b such as illustrated in FIG. 7, assures that all associated fibers shall fall in the same plane.

The chips depicted in FIG. 1 and FIG. 8 are designed with flat portions 21 at the exterior face which separate the adjacent grooves. The flats 21 aid in defining the individual grooves for initial alignment of the fibers 15. The chip 10 depicted in FIG. 9 has no flats, which may be an advantage where space is limited. The interior flats 22 shown in FIG. 8 are a further variation of chip design. The flats 22 are not contacted by the optical fibers 15.

Figure 10:
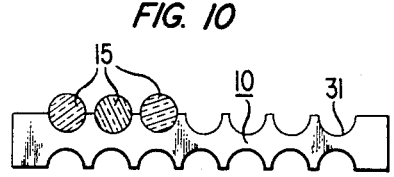

The FIG. 10 embodiment of chip 10 envisions grooves denoted 31, which are identical in purpose to those described above, but which are rounded to a diameter to precisely conform to the fiber diameter to be used. If the fiber diameter is constant and known, this chip-fiber configuration has the advantage of providing more positive position alignment by contacting the fiber at many points around its circumference. The range of fiber radii which can be used with this chip is small, however. One method of producing chips such as 10, suitable for use, pursuant to the invention, is by stamping of soft aluminum strips of suitable width with a precision machine hardened steel die. A chip made of metal has the advantages of stiffness, hardness, and permanence. Chips of equal minute detail and precision can also readily be cast in conventional casting equipment. In either case, the chips are easily massproduced at a nominal cost per chip in sufficiently high quantities.

The above-described techniques are eminently suitable for field splicing of an optical cable composed of ribbons containing linear arrays of optical fibers.

The spirit of the invention is embraced in the scope of the claims to follow.

What is claimed is:

1. An article for permanently locating the ends of a first group of optical fibers in abutting, axial alignment with corresponding ends of a second group of optical fibers, comprising:

a thin wafer having parallel flat top and bottom surfaces, each surface having an equal number of spaced parallel optical fiber-receiving longitudinal grooves of uniform cross section, the corresponding grooves of said surface being in vertical alignment, the geometry of each said groove being selected to assure spatial separation between two such articles when enveloping uniform diameter optical fibers thereinbetween.

2. An article described in claim 1, wherein each said groove is defined by first and second planar surfaces which, extended intersect in a "V" the subtended article of which is in a range of substantially 60° to 120°.

3. In combination:
first and second thin wafers with substantially parallel flat top and bottom surfaces at least one of said surfaces of each wafer having uniformly spaced, parallel optical fiber-receiving longitudinal grooves of uniform cross section; and
a transmission medium comprising a linear array of parallel optical fibers having the same uniform spacing as do said grooves,
each of said fibers being held between corresponding grooves of said first and second wafers,
said wafers being spatially separated when so holding said fibers.

4. The combination described in claim 3 wherein each said groove is defined by first and second planar surfaces which, extended intersect in a "V" the subtended article of which is in a range of substantially 60° to 120°.

5. A termination structure for an optical fiber cable comprising:
a plurality of stacked, relatively thin wafers each having parallel flat top and bottom surfaces, each said surface containing a number of longitudinal grooves of a uniform cross section and equal spacing, the corresponding grooves in the top and bottom surfaces of each said wafer being in vertical alignment; and
optical fibers of said cable supported within respective oppositely disposed grooves of adjacent said wafers, so that when so assembled, adjacent said wafers are spaced apart.

6. An optical fiber cable splice connector comprising:
first and second identical termination structures as defined in claim 5; and
at least one flat elongated aligning module having grooves which are the mating opposite of the uniform grooves of the said wafer surfaces;
said module matingly and mutually engaging outermost grooves of the assembly of both the first and the second termination structure, thereby to effect coaxial alignment of the corresponding fibers of the two said structures.

7. The connector of claim 6 further comprising:
refractive index matching means applied to optically connect corresponding said fibers; and
bonding means to permanentize the achieved alignment between said first and second terminal structures.

* * * * *

UNITED STATES PATENT OFFICE
CERTIFICATE OF CORRECTION

Patent No. 3,864,018           Dated February 4, 1975

Inventor(s) Calvin Max Miller

It is certified that error appears in the above-identified patent and that said Letters Patent are hereby corrected as shown below:

On the initial page of patent, item [73] 2nd line, "Murray Hill Heights" should be --Murray Hill--.

Signed and sealed this 29th day of April 1975.

(SEAL)
Attest:

RUTH C. MASON
Attesting Officer

C. MARSHALL DANN
Commissioner of Patents
and Trademarks